United States Patent [19]
Chen et al.

[11] Patent Number: 6,076,099
[45] Date of Patent: Jun. 13, 2000

[54] METHOD FOR CONFIGURABLE INTELLIGENT-AGENT-BASED WIRELESS COMMUNICATION SYSTEM

[76] Inventors: Thomas C. H. Chen; Conway T. Chen, both of 5468 Creek Dr., Houston, Tex. 77056

[21] Appl. No.: 08/929,212

[22] Filed: Sep. 9, 1997

[51] Int. Cl.[7] .............................. G06F 13/38; G06F 15/17
[52] U.S. Cl. ..................... 709/202; 709/221; 709/228
[58] Field of Search .................................. 709/202, 221, 709/227, 228, 230, 237

[56] References Cited

U.S. PATENT DOCUMENTS

| | | | |
|---|---|---|---|
| 5,161,632 | 11/1992 | Asayama | 180/167 |
| 5,218,367 | 6/1993 | Sheffer et al. | 342/457 |
| 5,223,844 | 6/1993 | Mansell et al. | 342/357 |
| 5,365,451 | 11/1994 | Wang et al. | 364/466 |
| 5,367,635 | 11/1994 | Bauer et al. | 709/221 |
| 5,424,746 | 6/1995 | Schwab et al. | 342/49 |
| 5,428,546 | 6/1995 | Shah et al. | 364/449 |
| 5,475,819 | 12/1995 | Miller et al. | . |
| 5,515,043 | 5/1996 | Beard et al. | 340/988 |
| 5,581,594 | 12/1996 | McAfee | 379/57 |
| 5,588,038 | 12/1996 | Snyder | 379/57 |
| 5,708,778 | 1/1998 | Monst | 709/228 |
| 5,862,327 | 1/1999 | Kwang et al. | . |

*Primary Examiner*—Mark H. Rinehart

[57] ABSTRACT

A method for a configurable intelligent-agent-based wireless communication system that can be used for conducting acquisition, processing, monitoring, tracking and reporting of data at remote mobile units over a wireless communication network. The system is comprised of an intelligent-agent-based wireless communication controller (110), a wireless data transmitter/receiver (120), a global positioning system data receiver (130), a plurality of data storage devices (140), a plurality of serial ports (150), a display device (160), and a battery with power charging circuitry (170).

17 Claims, 13 Drawing Sheets

METHOD FOR CONFIGURABLE INTELLIGENT-AGENT-BASED WIRELESS COMMUNICATION SYSTEM

BACKGROUND—FIELD OF THE INVENTION

This invention relates to a wireless communication system, specifically to a configurable intelligent-agent-based wireless communication system for conducting acquisition, processing, monitoring, tracking and reporting of data at remote mobile units over a wireless communication network.

BACKGROUND—DESCRIPTION OF THE PRIOR ART

There are many wireless communication systems that exist today for tracking, monitoring, and reporting of wireless data at remote mobile units. Some of these systems are as follows:

U.S. Pat. No. 5,161,632 issued to Yoshiaki Asayama on Nov. 10, 1992, pertains to a tracking control device for a vehicle which composed of image sensors, a display device, a window forming device, an image tracking device with instruction input, inter-vehicle distance detecting device, tracking instruction input device, and speed controlling device.

U.S. Pat. No. 5,218,367 issued to Eliezer A. Sheffer et al. on Jun. 8, 1993, pertains to a vehicle tracking system that makes use of a conventional cellular telephone network including a plurality of fixed cellular transmitter sites, each covering a predetermined area.

U.S. Pat. No. 5,223,844 issued to John P. Mansell et al. on Jun. 29, 1993, pertains to a vehicle tracking and security system which allows immediate response in case of vehicle theft, an accident, vehicle breakdown, or other emergency.

U.S. Pat. No. 5,365,451 issued to Theresa C. Y. Wang et al. on Nov. 15, 1994, pertains to a communication network that keeps track of the location of mobile units utilizing the network.

U.S. Pat. No. 5,424,746 issued to Carl E. Schwab et al. on Jun. 13, 1995, pertains to a system for tracking a vehicle equipped with a transponder which emits a first replay signal containing data identifying the vehicle in response to a first interrogation signal and emits a second replay signal containing data specifying the altitude of the vehicle in response to a second interrogation signal.

U.S. Pat. No. 5,428,546 issued to Mukesh C, Shah et al. on Jun. 27, 1995, pertains to a method and apparatus for simultaneously displaying a raster map and vectorized street information corresponding to a vehicle position.

U.S. Pat. No. 5,515,043 issued to Alfredo J. Berard et al. on May 7, 1996, pertains to a vehicle locating and alarm system that enables the user to remotely access the vehicle and, if needed, to activate an alarm system.

U.S. Pat. No. 5,581,594 issued to Christopher L. McAfee on Dec. 3, 1996, pertains to a wireless communication system that includes a paging-type system for sending messages to a mobile device.

U.S. Pat. No. 5,588,038 issued to Bernard M. Snyder on Dec. 24, 1996, pertains to a system and method for communicating with a remote location, such as a vehicle or building, the system including a calling transceiver, a central transceiver, and a satellite.

The primary shortcoming of the above mentioned wireless communication systems is the specificity of their applications; if the application is changed, the system will not work properly. Wireless communication technology today is changing rapidly, both in hardware and software. A preferable wireless communication system should have the capability to be reconfigured at run-time to adapt to changes in technology and application. In addition, a wireless communication system is different from a conventional wireline system in that it is usually operating in a wireless communication network with a much slower bandwidth. A conventional wireline data communication method, which usually requires many data communication trips to perform a task, is not suitable in a wireless data communication system. A more intelligent wireless communication system should have the capability to embed application agents within the system. These application agents can then perform specific tasks on the behalf of its remote control station when the system is unable to be reached or is too slow to give specific operation instructions. Also, the usage of the Internet World Wide Web as a vehicle to provide information and data to remote data browsers has become very popular in recent years. Therefore, a more desirable wireless communication system should have the capability to use both as a data request server and as a data request client on the Internet World Wide Web over a wireless communication network. Furthermore, in many situations, a wireless communication system can be used as a supervisory system of a group of subordinating systems for lower level monitoring and control. A useful wireless communication system should have the capability to function as a supervisor system for monitoring and controlling unexpected and dangerous conditions of its subordinating systems.

All the above mentioned systems are not an intelligent-agent-based wireless communication system. These systems are designed for predetermined tasks and can not be reconfigured while the systems are in operation. These systems neither be used as a data request server nor as a data request client on the Internet World Wide Web. In addition, these systems cannot be used as a supervisory system of a group of subordinating systems.

OBJECTS AND ADVANTAGES

It is therefore an object of the invention to provide a wireless communication system that uses a multiple intelligent agent method to distribute and conduct complex wireless data communication tasks on the behalf of its remote control station. The use of multiple intelligent agents method in this invention improves performance of the system when it is operating in a multiprocessing environment.

Another object of the invention is to provide a wireless communication system that will allow applications of the system to be reconfigured at run-time from a remote location over a wireless communication network. Reconfiguration of the system can be launched from a remote control station by sending reconfiguration instructions with a new application to the system without the need for physical contact. The reconfiguration process can be conducted either at an intelligent agent level or at system level.

Another object of the invention is to provide a wireless communication system to be used as a data request server on the Internet World Wide Web through a public standard protocol, such as Hyper Text Transmission Protocol (HTTP) or File Transfer Protocol (FTP). As an Internet World Wide Web server, data collected by the system can be remotely accessed by any plain text compatible data browser, Hyper Text Mark Language (HTML) compatible data browser, Handheld Device Mark Language (HDML) compatible data browser, or JAVA applets compatible data browser.

Another object of the invention is to provide a wireless communication system to be used as a data request client of a remote data request server using a public standard protocol, such as HTTP, or FTP. A data request can be made from the system to the remote data request server, and the data returned can be displayed on the display device of the system.

It is an additional object of the invention to provide a wireless communication system to function as a supervisory system for a group of subordinating systems. This capability is suitable for lower level monitoring and control of subordinating systems. This supervisor system only reports critical and essential data of subordinating systems to its remote control station to avoid an overload of information.

Further objects and advantages of this invention will become apparent from a consideration of the ensuing description and accompanying drawings.

BRIEF DESCRIPTION OF THE DRAWINGS

For a further understanding of the objects and advantages of the present invention, reference should be made to the following drawings in conjunction with the accompanying descriptions, wherein.

Figure 1:
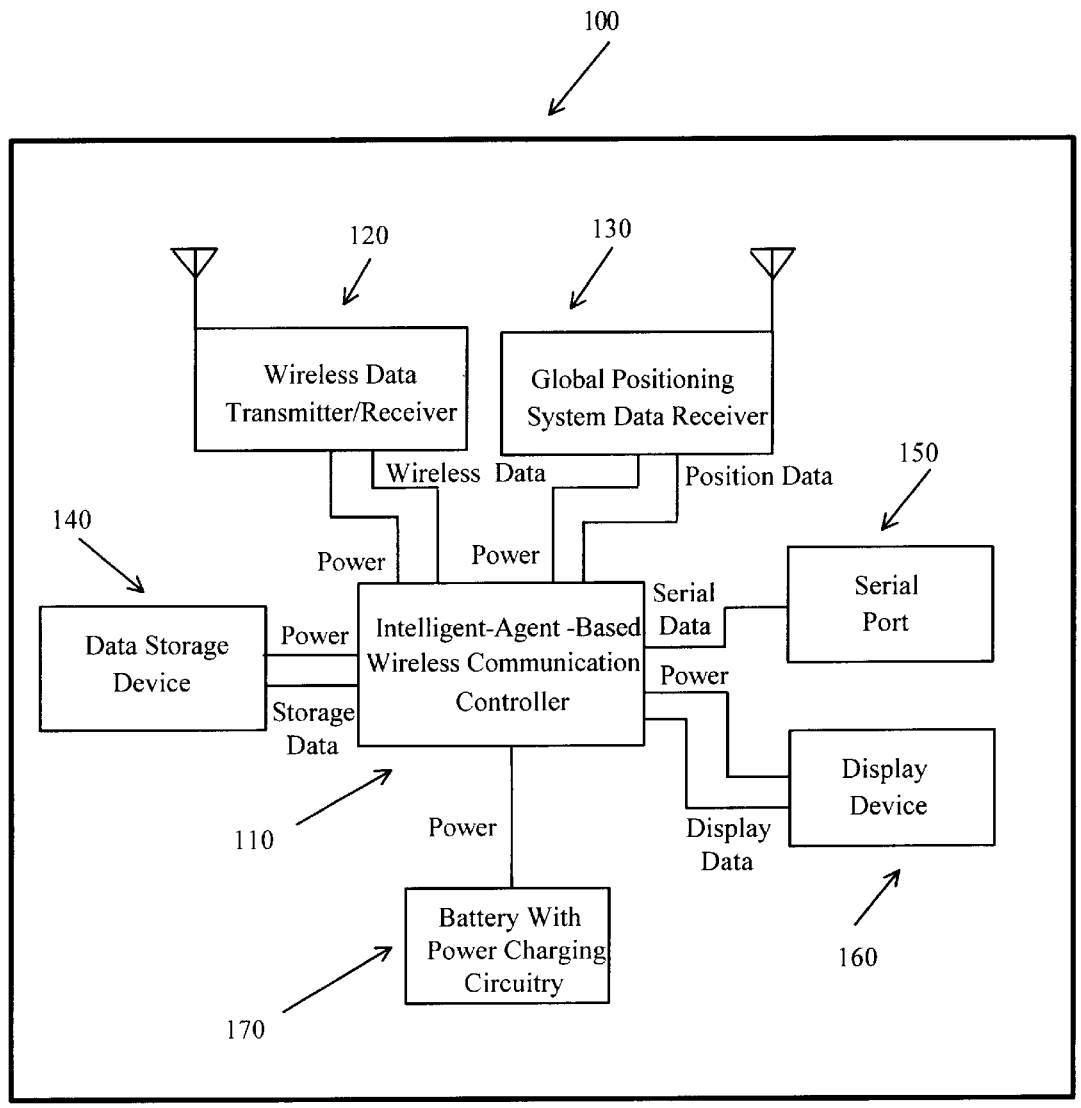
FIG. 1 is an illustrative block diagram of the components of the configurable intelligent-agent-based wireless communication system of the invention.

| Reference Numerals | | | |
|---|---|---|---|
| 100 | system apparatus | 110 | intelligent-agent-based wireless communication controller |
| 120 | wireless data transmitter/receiver | | |
| 140 | data storage device | 130 | global positioning system data receiver |
| 160 | display device | | |
| 200 | microprocessor | 150 | serial port |
| 220 | serial input/output converter for wireless data transmitter/receiver | 170 | battery with power charging circuitry |
| | | 210 | system memory |
| 240 | serial input/output converter for serial port | 230 | serial input/output converter for global positioning system data receiver |
| 260 | serial input/output converter for data storage device | 250 | serial input/output converter for display device |
| 300 | communication central control agent | 270 | system bus |
| 302 | communication central control agent application source | 301 | communication control board |
| 311 | wireless data gateway agent application source | 310 | wireless data gateway agent |
| | | 312 | wireless data queue |
| 320 | global positioning system agent | 321 | global positioning system agent application source |
| 322 | global positioning system data queue | 330 | serial port agent |
| | | 332 | serial port data queue |
| 331 | serial port agent application source | | |

SUMMARY

A method for a configurable intelligent-agent-based wireless communication system to be used for conducting acquisition, processing, monitoring, tracking and reporting of data at remote mobile units over a wireless communication network. The system is comprised of an intelligent-agent-based wireless communication controller, a wireless data transmitter/receiver, a global positioning system data receiver, a plurality of serial ports, a plurality of data storage devices, a display device, and a battery with power charging circuitry. The method of the system includes multiple intelligent agents for conducting wireless communication tasks, run-time configurable agent application, data request server and data request client capabilities for accessing the Internet World Wide Web, and lower level data monitoring and controlling of subordinating systems through a wireless communication network.

Preferred Embodiment—Description

FIG. 1 shows the components of system apparatus 100 of a configurable intelligent-agent-based wireless communication system. The main component of system apparatus 100 is an intelligent-agent-based wireless communication controller 110. Intelligent-agent-based wireless communication controller 110 is connected to a wireless data transmitter/receiver 120, a global positioning system data receiver 130, a plurality of data storage devices 140, a plurality of serial ports 150, a display device 160, and a battery with power charging circuitry 170.

Wireless data transmitter/receiver 120 is a microcontroller with antenna, and is used to receive and transmit data over a wireless communication network. Global positioning system data receiver 130 is a position locating assembly with antenna, and is used to locate the position of a mobile unit through data transmitting from three or more satellites. Data storage device 140 is a file storage devices, and is used to store application program modules and data records. Serial port 150 is used to connect external instruments to be monitored by system apparatus 100. Display device 160 is a liquid crystal display, and is used to display character and graphic information. Battery with power charging circuitry 170 provides power to the components of system apparatus 100. When an external power source is available, the battery is charged through power charging circuitry.

Figure 2:
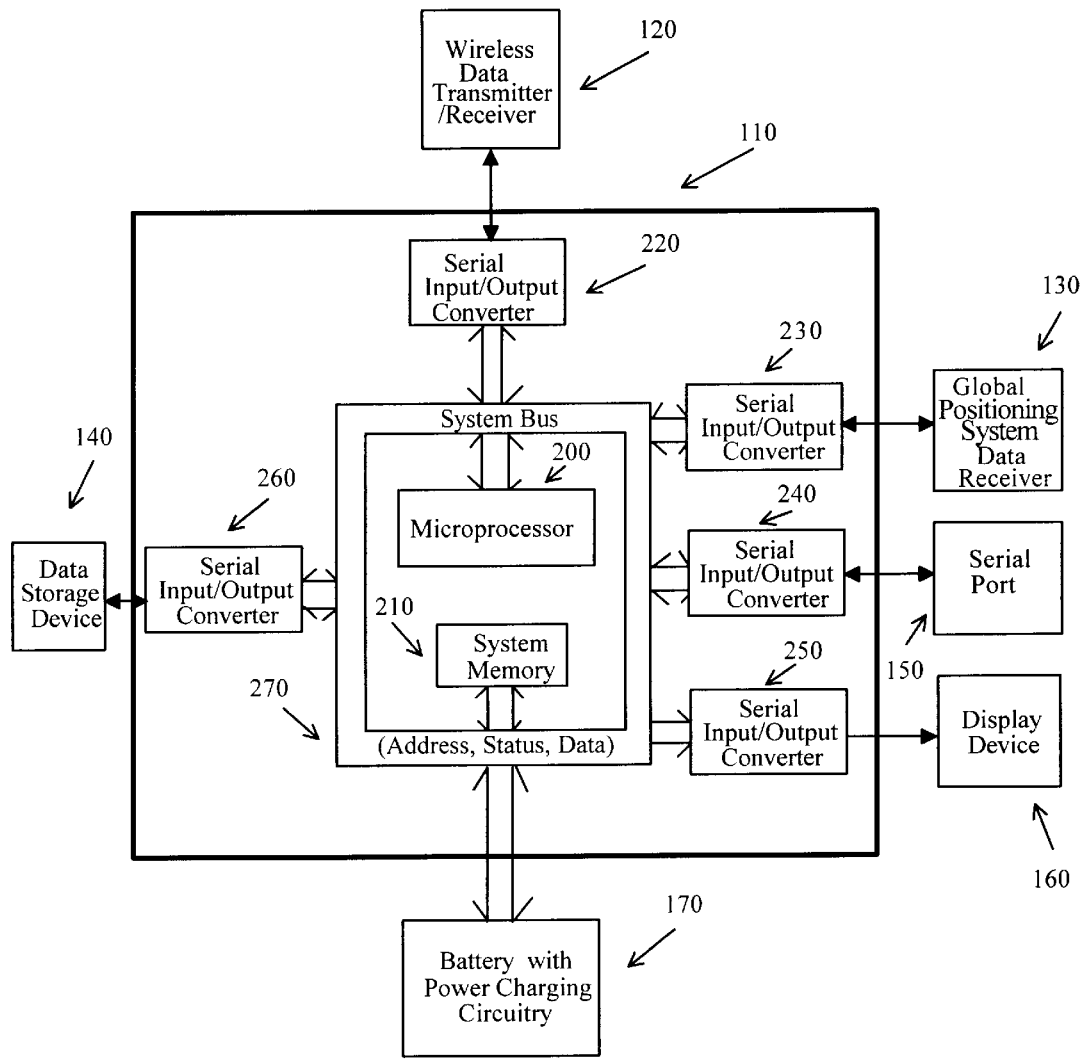
FIG. 2 is an illustrative block diagram of the internal components of the intelligent-agent-based wireless communication controller which forms a part of the configurable intelligent-agent-based wireless communication system.

FIG. 2 shows the internal components of intelligent-agent-based wireless communication controller 110. The main component of intelligent-agent-based wireless communication controller 110 is microprocessor 200. Microprocessor 200 is connected to system memory 210 through system bus 270 for passing memory address, data and control. Serial input/output converter 220 is connected to wireless data transmitter/receiver 120 and microprocessor 200. Serial input/output converter 230 is connected to global positioning system data receiver 130 and microprocessor 200. Serial input/output converter 240 is connected to serial port 150 and microprocessor 200. Serial input/output converter 260 is connected to data storage device 140 and microprocessor 200. Similarly, serial input/output converter 250 is connected to display device 160 and microprocessor 200.

Data storage device 140 stores a set of computer programming codes. When system apparatus 100 is powered up, these computer programming codes are loaded into system memory 210. Computer programming codes stored in data storage device 140 contain an operating system, a data communication stack, a plurality of data request servers, and a plurality of application program modules. The operating system of the invention is a real-time, embedded operating system with multiprocessing capability. The data communication stack of the invention contains a public standard stack, such as Transmission Control Protocol/Internet Protocol (TCP/IP). The TCP/IP stack of the invention includes a set of communication routines that are used to communicate between different computers and networks. Transmission Control Protocol (TCP) provides end-to-end data delivery services, while Internet Protocol (IP) handles the addressing and routing of data. Internet Protocol (IP) address defined in the TCP/IP stack uniquely identifies system apparatus 100 as an physical node rather than a geographic location in an Internet TCP/IP network. The data request server of the invention contains public standard data request servers such as Hyper Text Transmission Protocol (HTTP) server with a Common Gateway Interface (CGI), and File Transfer Protocol (FTP) server. HTTP is a network protocol which allows Word Wide Web pages to be transferred over the Internet. CGI extends the capability of HTTP to access other data media. FTP is a file transfer protocol which allows files to be transferred from one computer to another.

Figure 3:
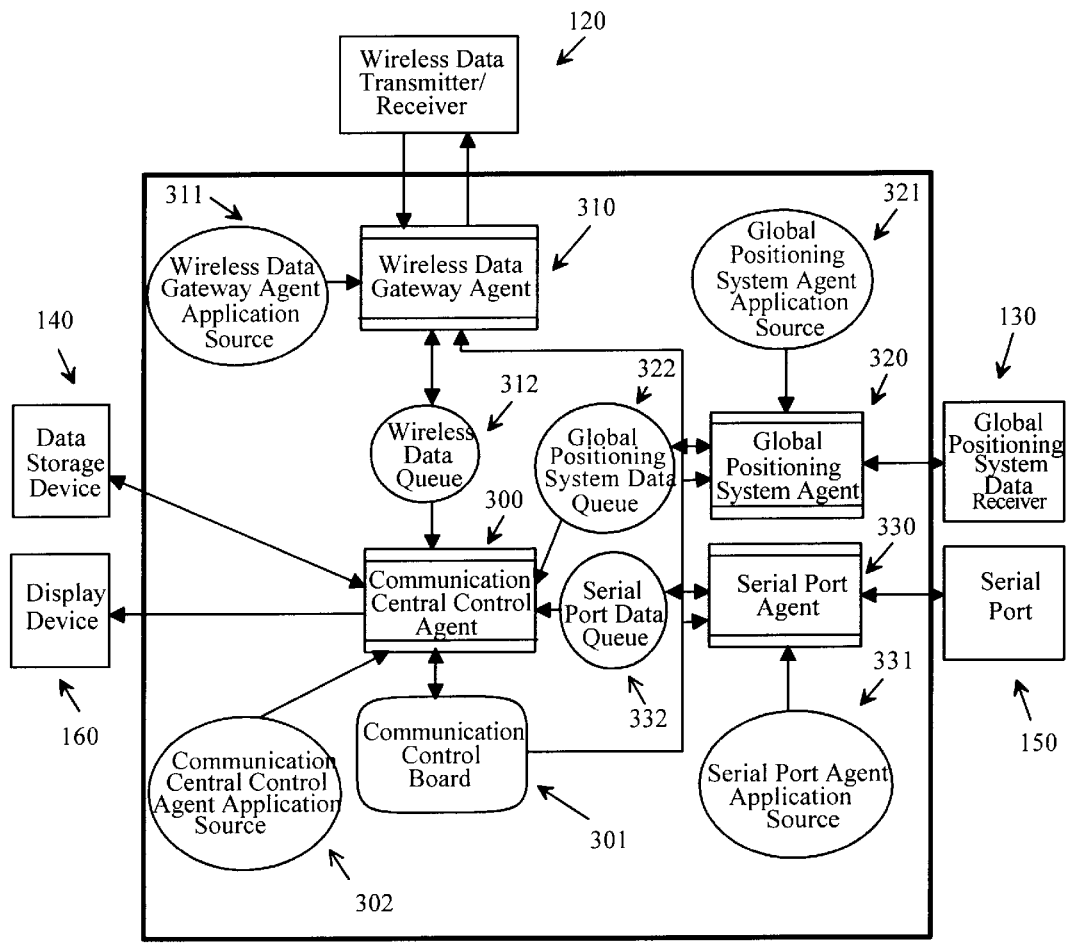
FIG. 3 is an illustrative block diagram of various intelligent agents and their operations contained in the application program modules of the invention.

FIG. 3 shows a block diagram of various intelligent agents and their operations contained in the application program modules. An intelligent agent of the invention is a software component that is used to perform specific tasks on the behalf of its remote control station. Each intelligent agent runs under one of many processes maintained by the operating system. Multiprocessing capability of the invention enables microprocessor 300 to use its full processing power. System apparatus 100 uses a multiple intelligent agent method to distribute complex wireless data communication tasks to an individual agent. The intelligent agents of the invention include communication central control agent 300 with application source 302, wireless data gateway agent 310 with application source 311, global positioning system agent 320 with application source 321, and a plurality of serial port agents 330 with application source 331. Communication central control agent 300 also includes communication control board 301, wireless data queue 312, global positioning system data queue 322, and a plurality of serial port data queue 332.

An application source of an intelligent agent of the invention is a set of computer programming codes that is executed by the operation system to accomplish certain tasks defined for the intelligent agent. Communication central control agent application source 302 contains the computer programming codes for reading and processing incoming data from wireless data queue 312, writing command data to wireless data gateway agent 310, reading and processing incoming data from global positioning system data queue 322, writing command data to global positioning system agent 320, reading and processing incoming data from serial port data queue 332, writing command data to serial port agent 330, reading data from data storage device 140, writing data to data storage device 140 in a specific data form, sending data to display device 160, unloading old application source, and loading new application source.

Wireless data gateway agent application source 311 contains the computer programming codes for listening and processing incoming data from wireless data transmitter/receiver 120, writing incoming data to wireless data queue, reading and processing data from communication control board 301, sending outgoing data to wireless data transmitter/receiver 120, unloading old application source, and loading new application source. Wireless data gateway application source 311 also contains the computer programming codes of how to start and stop a data request server, such as Hyper Text Transmission Protocol (HTTP) server, or File Transmission Protocol (FTP) server.

Global positioning system agent application source 321 contains the computer programming codes for reading and processing incoming data from global positioning system data receiver 130, writing incoming data to global positioning system data queue 322, reading and processing data from communication control board 301, sending outgoing data to global positioning system data receiver 130, unloading old application source, and loading new application source.

Serial port agent application source 331 contains the computer programming codes for reading and processing incoming data from serial port 150, writing incoming data to serial port data queue 332, reading and processing data from communication control board 301, unloading old application source, and loading new application source.

Preferred Embodiment—Operation

System apparatus 100 can be used and operated in four different ways. First, it can be used as a wireless communication system to monitor and control instruments attached to the serial port of system apparatus 100 without using a global positioning system data receiver 130. Second, it can be used as a wireless communication system to monitor, and track the position of system apparatus 100 using a global positioning system data receiver 130. Third, it can be used as a wireless communication system to acquire and display a request from a remote data request server. Fourth, it can be used as a wireless communication system to monitor and control remote subordinating systems by system apparatus 100.

Figure 4:
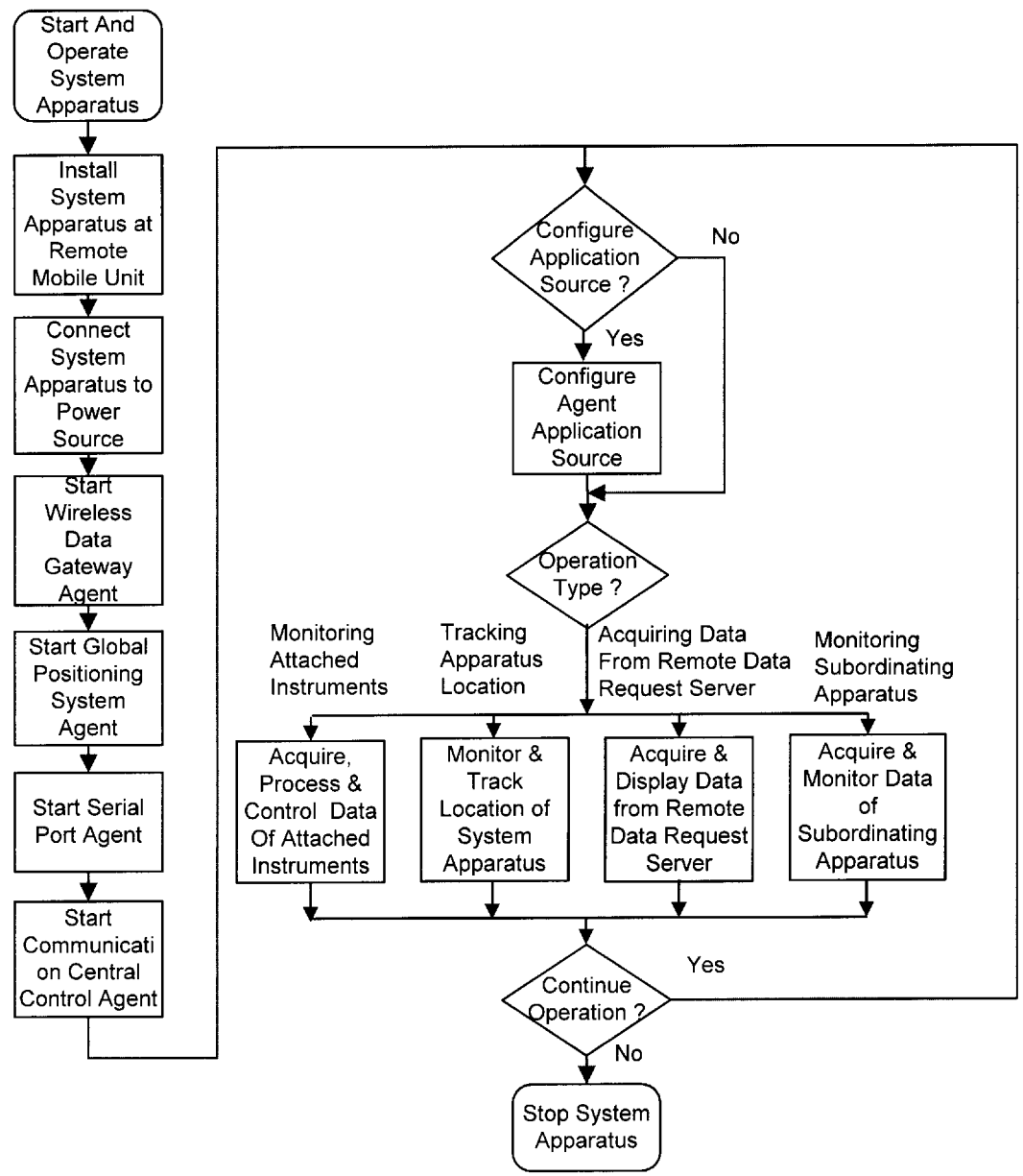
FIG. 4 is a flow chart illustrating the steps to install and operate the configurable intelligent-agent-based wireless communication system of the invention.
Figure 5:
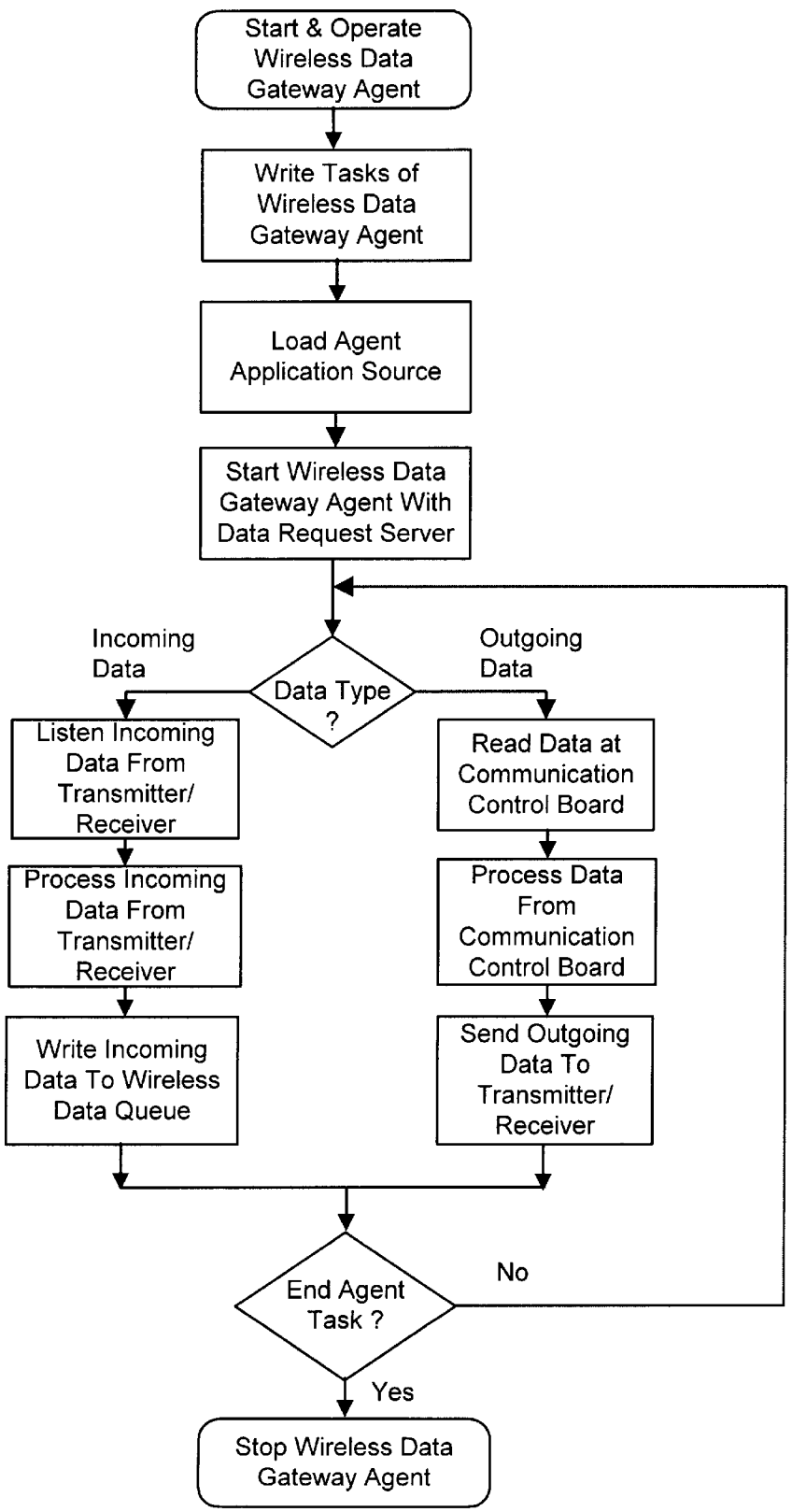
FIG. 5 is a flow chart illustrating the steps to start and operate the wireless data gateway agent.
Figure 6:
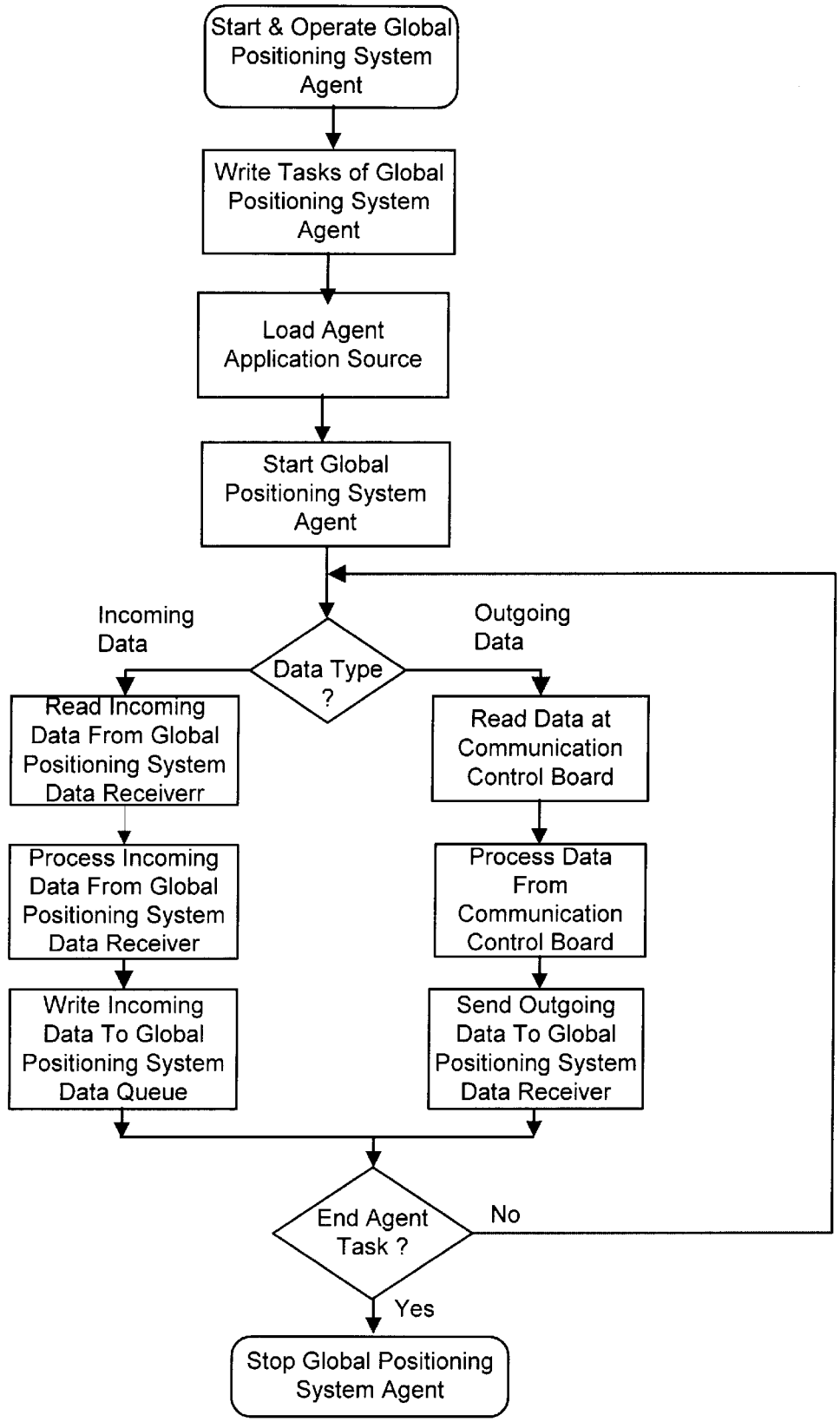
FIG. 6 is a flow chart illustrating the steps to start and operate the global positioning system (GPS) agent.
Figure 7:
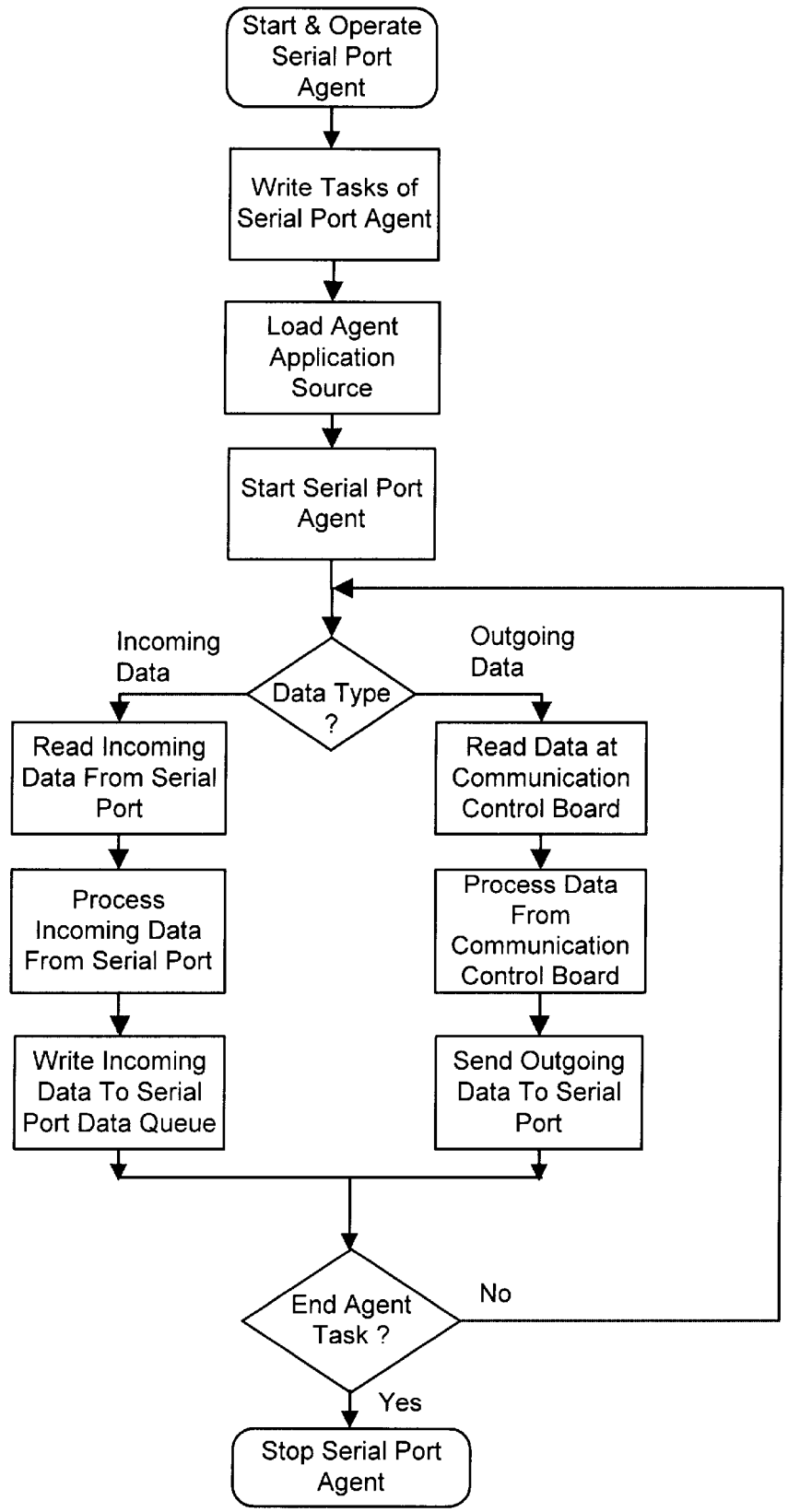
FIG. 7 is a flow chart illustrating the steps to start and operate the serial port agent.
Figure 8:
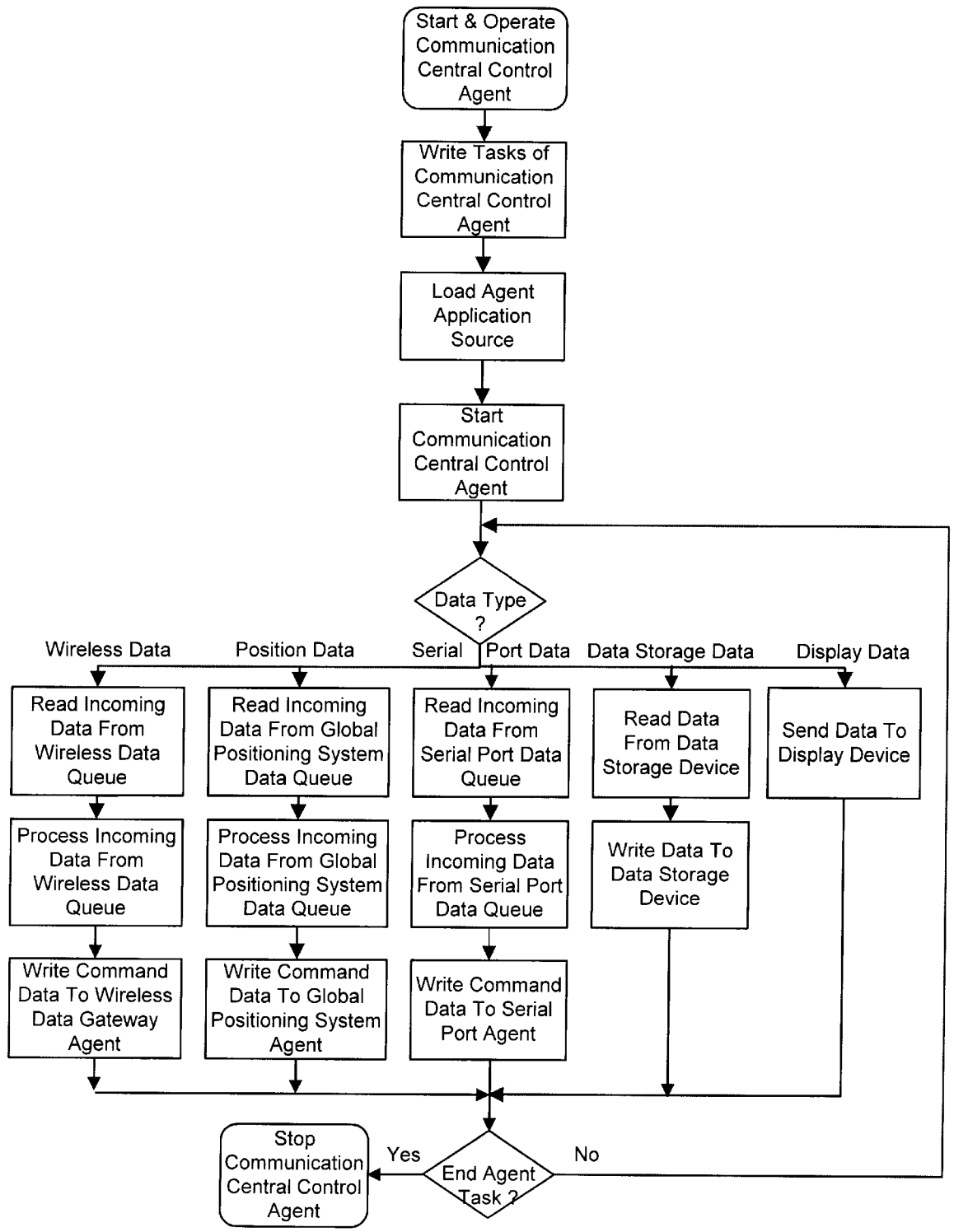
FIG. 8 is a flow chart illustrating the steps to start and operate the c communication central control agent.
Figure 9:
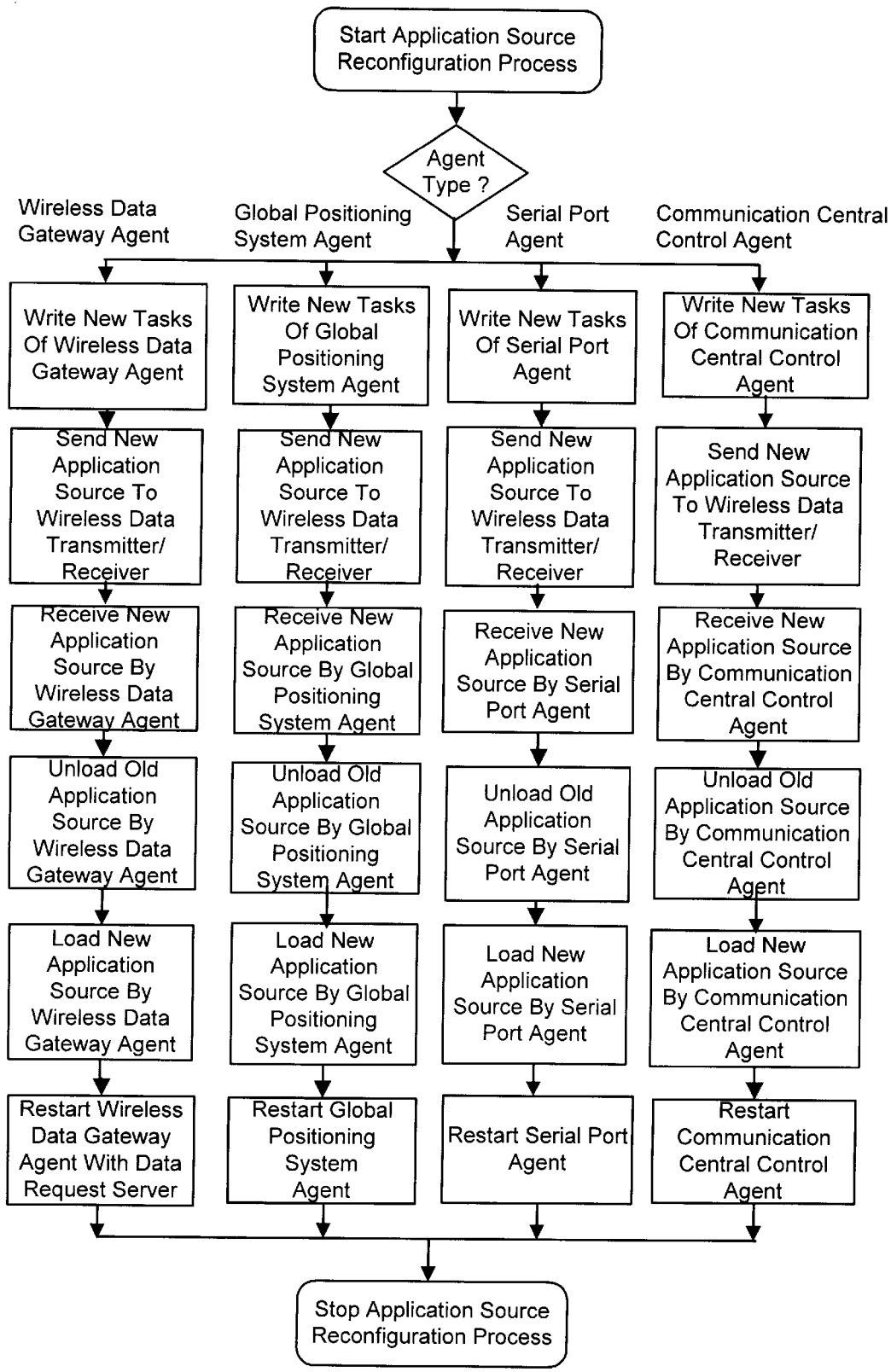
FIG. 9 is a flow chart illustrating the steps to reconfigure the application source of each intelligent agent.
Figure 10:
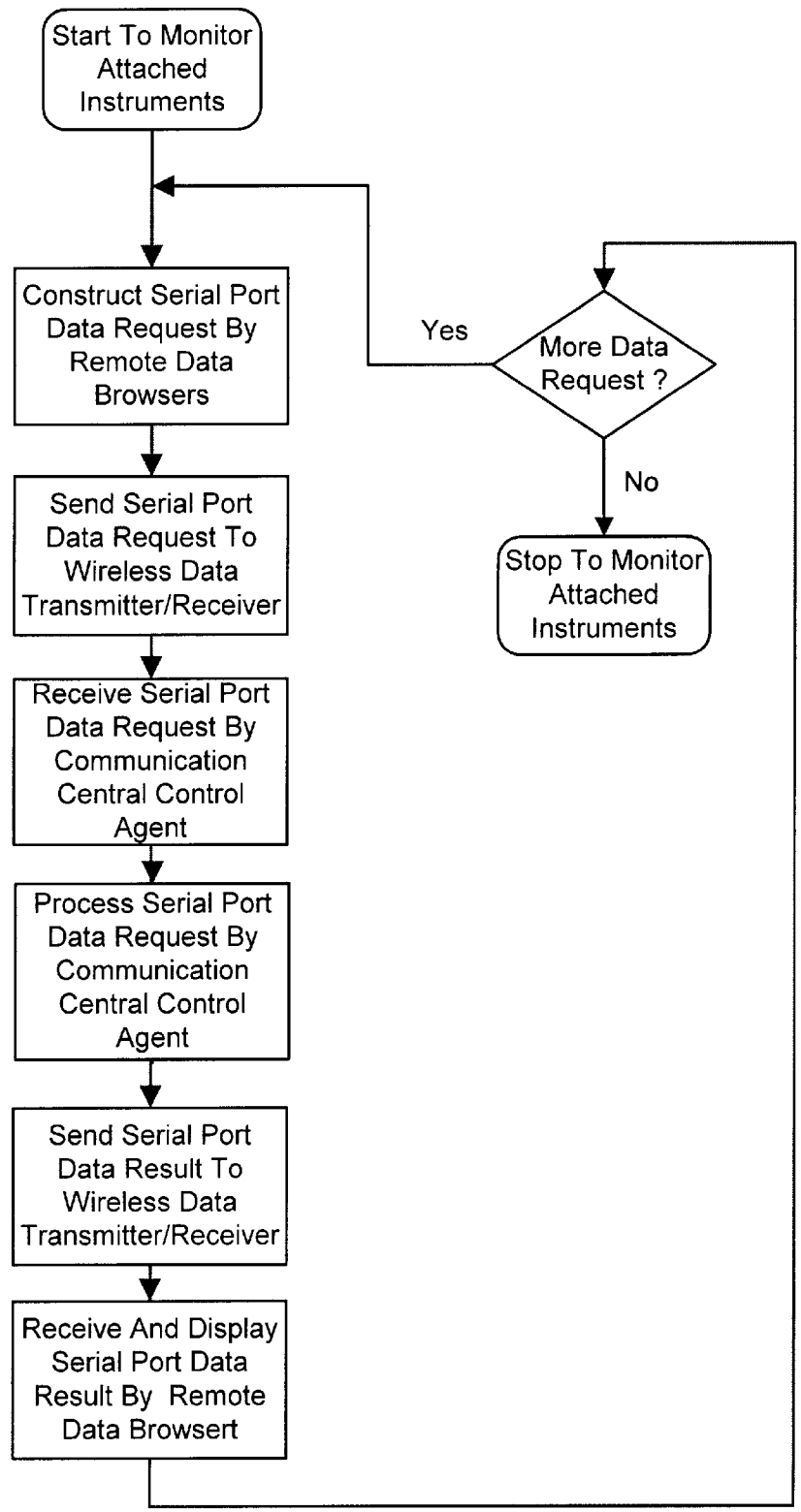
FIG. 10 is a flow chart illustrating the steps to monitor instruments attached to the serial port of the configurable intelligent-agent-based wireless communication system.
Figure 11:
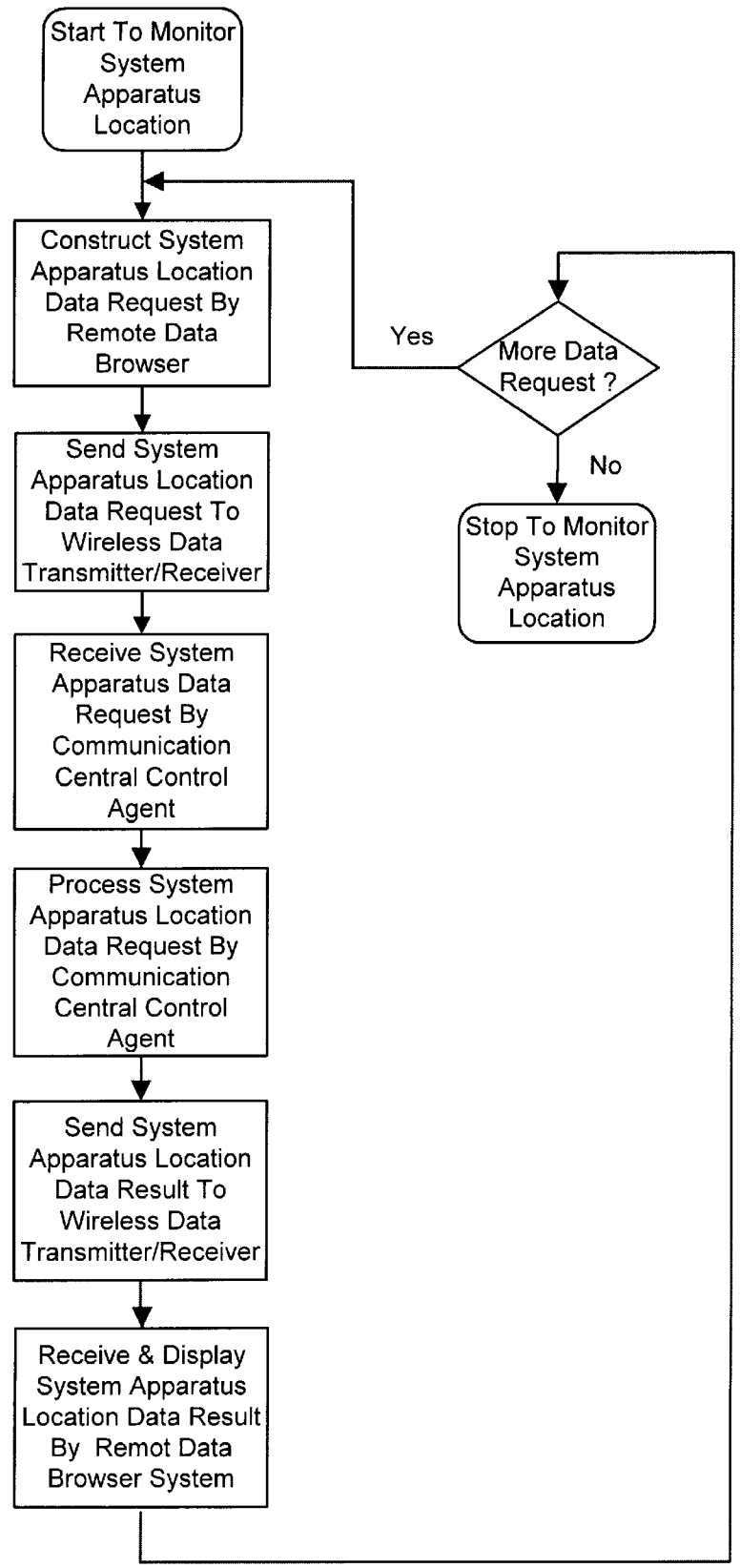
FIG. 11 is a flow chart illustrating the steps to monitor and track the location of the configurable intelligent-agent-based wireless communication system.
Figure 12:
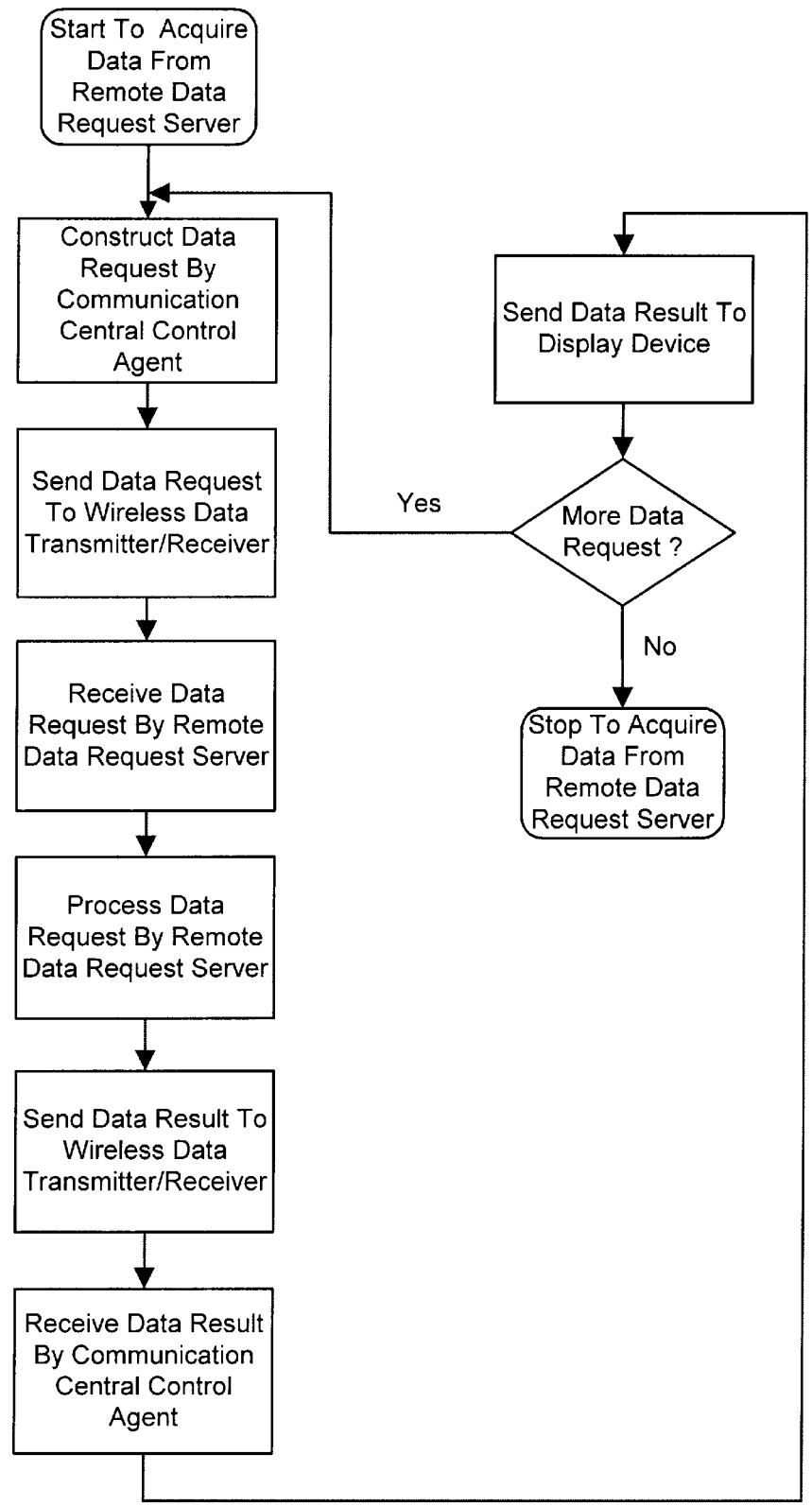
FIG. 12 is a flow chart illustrating the steps to acquire data from a remote data request server by the configurable intelligent-agent-based wireless communication system.
Figure 13:
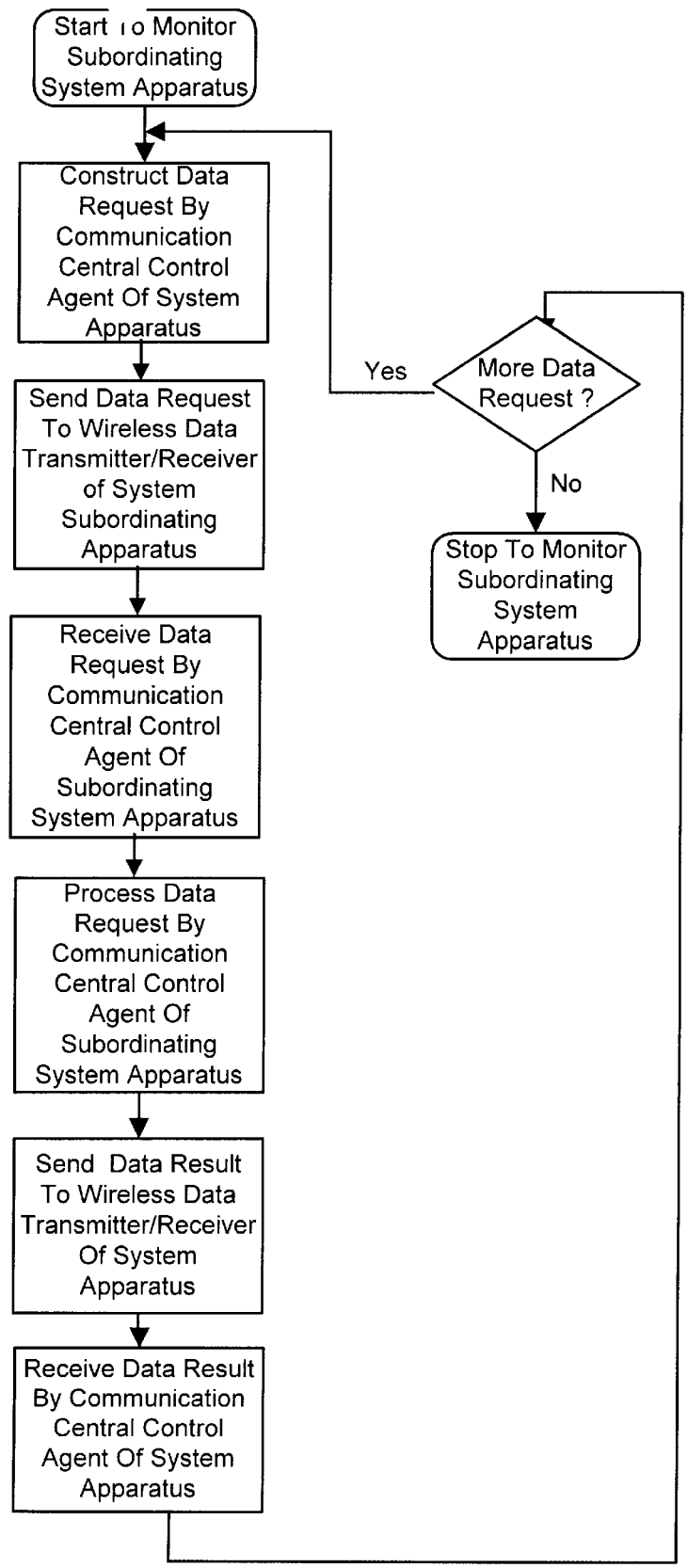
FIG. 13 is a flow chart illustrating the steps to monitor and control remote subordinating systems by the configurable intelligent-agent-based wireless communication system.

FIG. 4 through FIG. 13 are more detailed flow charts of the operation of system apparatus 100. FIG. 4 illustrates the steps to install and operate system apparatus 100 of the invention. FIG. 5 illustrates the steps to start and operate wireless data gateway agent 310 of system apparatus 100. FIG. 6 illustrates the steps to start and operate global positioning system agent 320 of system apparatus 100. FIG. 7 illustrates the steps to start and operate serial port agent 330 of system apparatus 100. FIG. 8 illustrates the steps to start and operate communication central control agent 300 of system apparatus 100. FIG. 9 illustrates the steps to reconfigure application source of each intelligent agent of system apparatus 100. FIG. 10 illustrates the steps to monitor and control instruments attached to the serial ports of system apparatus 100 without using a global positioning system data receiver 130. FIG. 11 illustrates the steps to monitor, and track the position of system apparatus 100 using a global positioning system data receiver 130. FIG. 12 illustrates the steps to acquire data from a remote data request server by system apparatus 100. FIG. 13 illustrates the steps to monitor and control remote subordinating systems by system apparatus 100.

As shown in FIG. 3, data communication channel among communication central control agent 300 and other agents is established through communication control board 301 and data queues. Communication control board 301 is a block of shared system memory which is accessible by communication central control agent 300 and all other intelligent agents simultaneously. Each data queue maintains a message buffer which is based on First-In First-Out (FIFO) methodology. Data communication from wireless data gateway agent 310, global positioning system agent 320, and serial port agent 330 to communication central control agent 300 is conducted through data queues. Wireless data gateway agent 310, global positioning system agent 320, and serial port agent 330 can write to and read from data queues while communication central control agent 300 can only read from data queues. Data communication from communication central control agent 300 to wireless data gateway agent 310, global positioning system agent 320, and serial port agent 330 is conducted through communication control board 301. Communication central control agent 300 can write to and read from communication control board 301 while wireless data gateway agent 310, global positioning system agent 320, and serial port agent 330 can only read and retrieve specific data for that agent from communication control board 301. Data communication channel of the invention allows communication central control agent 300 to have a full control of how data shall be filtered and what commands will be passed to an intelligent agent.

System apparatus 100 allows the application source of each intelligent agent to be reconfigured at run-time from its remote control station over a wireless communication network. Each intelligent agent has a default application source which is loaded and set to run when system apparatus 100 is started. If an intelligent agent receives a reconfiguration notice with an new application source from its remote control station, the old application source will be unloaded and the new application source will be loaded and reset to run while system apparatus 100 is still in operation. Reconfiguration process can be conducted at either an intelligent agent level or at system level. For example, if communication central control agent 300 reads a reconfiguration notice for serial port agent 330 from wireless data queue 312, it can write a reconfiguration command to communication control board 301 for serial agent 330. Another example, if communication central control agent 300 read a reconfiguration notice for the entire system from wireless data queue 312, it can write a global reconfiguration command to communication control board 301 for all agents. Each agent, after reading the reconfiguration command from communication control board 301, can conduct reconfiguration process as accordingly.

System apparatus 100 can also operate as a data request server on the Internet World Wide Web over a wireless communication network. In this operation, system apparatus 100 can be configured in two different ways. First, if wireless data gateway agent 310 is configured to be started with a public standard Hyper Text Transmission Protocol (HTTP) data request server and a Common Gateway Interface (CGI), any Internet data browser at remote location can access data stored at data storage device 140. The format of data stored in data storage device 140 includes plain text, Hyper Text Mark Language (HTML), Handheld Device Mark Language (HDML), and JAVA applets which are computer programming components written in a JAVA programming language from SUN MICROSYSTEMS. Second, if wireless data gateway agent 310 is configured to be started with a public standard File Transfer Protocol (FTP) data request server, any Internet data browser can download data stored at data storage device 140 at fast speed.

System apparatus 100 can also operate as a data request client of a remote data request server using a public standard protocol, such as HTTP or FTP through a wireless communication network. A data request is constructed by communication central control agent 300 and sent to the remote data request server through wireless data transmitter/receiver 120. If the remote data request server is responding to the data request, the data returned can be displayed at display device 160.

System apparatus 100 can also function as a supervisory system of other subordinating systems. This capability is suitable for lower level monitoring and controlling of a group of subordinating systems. The supervisor system only reports critical data or exception conditions of subordinating systems to its remote control station. This capability avoids the problem of data and information overloading the control station. To initiate a request to its subordinating system, a supervisory system acts as a data request client while its subordinating system acts as a data request server. A request is made from a data request client to a data request server using the Internet Protocol (IP) address of the data request server. Data is returned to the data request client after a request is completed.

Conclusions, Ramifications, and Scope

Accordingly, it can be seen that the use of a configurable intelligent-agent-based wireless communication system of the invention provides a highly intelligent, configurable, and efficient method for conducting acquisition, processing, monitoring, tracking, and reporting of wireless data at remote mobile units. The configurable intelligent-agent-based wireless communication system also provides the capabilities both as a data request server and as a data request client on the Internet World Wide Web over a wireless communication network. In addition, the configurable intelligent-agent-based wireless communication system can function as a supervisor system of a group of subordinating systems.

Although the description above contains many specificities, these should not be construed as limiting the scope of the invention but as merely providing illustrations of some of the presently preferred embodiments of this invention. Various other embodiments and ramifications are possible within it's scope. For example, each intelligent agent contained in the application program modules of the invention can be coded as an expert system to represent and incorporate human knowledge. An expert system is comprised of a set of knowledge base and an inference engine.

Representation of knowledge base of the invention includes heuristic knowledge and procedural knowledge. Heuristic knowledge of the invention are represented by rules. A rule is composed of an antecedent and a consequent. Antecedent of a rule is a set of conditions which must be satisfied for the rule's consequent to be applied. Procedure knowledge of the invention are represented by functions or objects with properties and methods. Procedure knowledge of the invention is similar to procedure functions of a conventional programming language. Inference engine of the invention contains a control strategy of when and how to make effectively use of knowledge base. Inference engine of the invention contains both backward and forward chaining control strategies.

Another example is that a private protocol of data communication stack and a private protocol of data request server with its own gateway interface can be used in this invention. The data transmitted under this method is more secure than data transmitted using a public standard data communication stack and data request server.

Thus the scope of the invention should be determined by the appended claims and their legal equivalents, rather than by the examples given.

What is claimed is:

1. A method of conducting acquisition, processing, monitoring, tracking and reporting of data on a system apparatus with a configurable intelligent-agent-based wireless communication system, comprising the step of:
   (a) providing an intelligent-agent-based wireless communication controller comprising a microprocessor, a system memory, a system bus, a serial input/output converter of wireless data transmitter/receiver, a serial input/output converter of global positioning system data receiver, a plurality of serial input/output converters of serial port, a plurality of serial input/output converters of data storage device, and a serial input/output converter of display device of said intelligent-agent-based wireless communication controller, and means for acquiring, processing, monitoring, tracking and reporting of data at said system apparatus, and
   (b) providing a wireless data transmitter/receiver connecting to said intelligent-agent-based wireless communication controller, and means for transmitting and receiving data over a wireless communication network, and
   (c) providing a global positioning system data receiver connecting to said intelligent-agent-based wireless communication controller, and means for receiving position data of said system apparatus from satellites, and
   (d) providing a plurality of serial ports connecting to said intelligent-agent-based wireless controller, and means for monitoring and controlling instruments attached to said system apparatus, and
   (e) providing a plurality of data storage devices connecting to said intelligent-agent-based wireless communication controller, and means for storing an operation system, a data communication stack, a plurality of data request servers, and
   (f) providing a display device connecting to said intelligent-agent-based wireless communication controller, and means for displaying data at said system apparatus, and
   (g) providing a battery with power charging circuitry, and means for supplying power source to said system apparatus, and
   (h) starting said operating system at said system apparatus, and
   (i) starting a wireless data gateway agent at said system apparatus, and
   (j) starting a global positioning system agent at said system apparatus, and
   (k) starting a plurality of serial port agents, at said system apparatus, and
   (l) starting a communication central control agent with a communication control board, a wireless data queue, a global positioning system data queue, a plurality of serial port data queues, at said system apparatus, and
   (m) configuring application source of said system apparatus, and
   (n) conducting communication operation at said system apparatus, and
   (o) repeating the step of (m) through (n) while said system apparatus is in operation.

2. The method as recited in claim 1, wherein said data communication stack of step (e) is selectively to use a transmission control protocol/internet protocol.

3. The method as recited in claim 1, wherein step (i) comprising the steps of:
   (i-1) writing tasks of said wireless data gateway agent in application source format and storing in said data storage device, and
   (i-2) loading said application source of said wireless data gateway agent from said data storage device into said system memory, and
   (i-3) starting said wireless data gateway agent with a data request server, and
   (i-4) listening incoming data from said wireless data transmitter/receiver, and
   (i-5) processing said incoming data from said wireless data transmitter/receiver, and
   (i-6) writing said incoming data to said wireless data queue, and
   (i-7) reading command data for said wireless data gateway agent at said communication control board, and
   (i-8) processing said command data from said communication control board, and
   (i-9) sending outgoing data to said wireless data transmitter/receiver, and
   (i-10) repeating step (i-4)) through (i-9) while said wireless data gateway agent is in operation.

4. The method as recited in claim 3, wherein said data request server of step (i-3) is selectively to use a hyper text transmission protocol server.

5. The method as recited in claim 3, wherein said data request server of step (i-3) is selectively to use a file transfer protocol server.

6. The method as recited in claim 1, wherein step (j) comprising the steps of:
   (j-1) writing tasks of said global positioning system agent in application source format and storing in said data storage device, and
   (j-2) loading said application source of said global positioning system agent from said data storage device into said system memory, and
   (j-3) starting said global positioning system agent, and
   (j-4) reading incoming data at global positioning system data receiver, and
   (j-5) processing said incoming data from said global positioning system data receiver, and
   (j-6) writing said incoming data to said global positioning system data queue, and (j-7) reading command data for said global positioning system agent at said communication control board, and (j-8) processing said command data from said communication control board, and (j-9) sending outgoing data to said global positioning system data receiver, and (j-10) repeating step (j-4)) through (j-9) while said global positioning system agent is in operation.

7. The method as recited in claim 1, wherein step (k) comprising the steps of:

(k-1) writing tasks of said serial port agent in application source format and storing in said data storage device, and (k-2) loading said application source of said serial port agent from said data storage device into said system memory, and (k-3) starting said serial port agent, and (k-4) reading incoming data from said serial port, and (k-5) processing said incoming data from said serial port, and (k-6) writing said incoming data to said serial port data queue, and (k-7) reading command data for said serial port agent at said communication control board, and (k-8) processing said command data from said communication control board, and (k-9) sending outgoing data to said serial port, and (k-10) repeating step (k-4) through (k-9) while said serial port agent is in operation.

8. The method as recited in claim 1, wherein step (l) comprising the steps of:

(l-1) writing tasks of said communication central control agent in application source format and storing in said data storage device, and (l-2) loading said application source of said communication central control agent from said data storage device into said system memory, and (l-3) starting said communication central control agent, and (l-4) reading incoming data from said wireless data queue, and (l-5) processing incoming data from said wireless data queue, and (l-6) writing command data to said communication control board for said wireless data gateway agent, and (l-7) reading incoming data from said global positioning system data queue, and (l-8) processing incoming data from global positioning system data queue, and (l-9) writing command data to said communication control board for said global positioning system agent, and (l-10) reading incoming data from said serial port data queue, and (l-11) processing incoming data from said serial port data queue, and (l-12) writing command data to said communication control board for said serial port agent, and (l-13) writing data to said data storage device in a data form, and (l-14) reading data from said data storage device, and (l-15) sending data to said display device, and (l-16) repeating step (l-4)) through (l-15) while said communication central control agent is in operation.

9. The method as recited in claim 8, wherein said data form of step (l-13) is selectively to use a plain text format.

10. The method as recited in claim 8, wherein said data form of step (l-13) is selectively to use a hyper text mark language format.

11. The method as recited in claim 8, wherein said data form of step (l-13) is selectively to use a handheld device mark language format.

12. The method as recited in claim 8, wherein said data form of step (l-13) is selectively to use a java applets format.

13. The method as recited in claim 1, wherein step (m) comprising the steps of:

(m-1) reconfiguring application source of said wireless data gateway agent, further comprising the steps of:

(m-1-1) writing new tasks of said wireless data gateway agent in application source format, and (m-1-2) sending new application source of said wireless data gateway agent to said wireless data transmitter/receiver, and (m-1-3) receiving said new application source by said wireless data gateway agent, and (m-1-4) unloading old application source of said wireless data gateway agent, and (m-1-5) loading said new application source of said wireless data gateway agent, and (m-1-6) restarting said wireless data gateway agent with a data request server, and (m-2) reconfiguring application source of said global positioning system agent, further comprising the steps of:

(m-2-1) writing new tasks of global positioning system agent in application source format, and (m-2-2) sending new application source of said global positioning system agent to said wireless data transmitter/receiver, and (m-2-3) receiving said new application source by said global positioning system agent, and (m-2-4) unloading old application source of said global positioning system agent, and (m-2-5) loading said new application source of said global positioning system agent, and (m-2-6) restarting said global positioning system agent, and (m-3) reconfiguring application source of said serial port agent, further comprising the steps of:

(m-3-1) writing new tasks of said serial port agent in application source format, and (m-3-2) sending new application source of said serial port agent to said wireless data transmitter/receiver, and (m-3-3) receiving said new application source by said serial port agent, and (m-3-4) unloading old application source of said serial port agent, and (m-3-5) loading said new application source of said serial port agent, and (m-3-6) restarting said serial port agent, and (m-4) reconfiguring application source of said communication central control agent, further comprising the steps of:

(m-4-1) writing new tasks of said communication central control agent in application source format, and (m-4-2) sending new application source of said communication central control agent to said wireless data transmitter/receiver, and (m-4-3) receiving said new application source by said communication central control agent, and (m-4-4) unloading old application source of said communication central control agent, and (m-4-5) loading said new application source of said communication central control agent, and (m-4-6) restarting said communication central control agent.

14. The method as recited in claim 1, wherein said communication operation of step (n) is selectively for the tasks of monitoring attached instruments at said system apparatus, further comprising the step of:

(a) constructing a serial port data request by a remote data browser, and (b) sending said serial port data request by said remote data browser to said wireless data transmitter/receiver of said system apparatus, and (c) receiving said serial port data request by said communication central control agent of said system apparatus, and (d) processing said serial port data request by said communication central control agent of said system apparatus, and (e) sending a serial port data result by said communication central control agent of said system apparatus to said remote data browser, and (f) receiving said serial port data result from said communication central control agent of said system apparatus by said remote data browser, and (g) displaying said serial port data result by said remote data browser.

15. The method as recited in claim 1, wherein said communication operation of step (n) is selectively for the tasks of tracking location of said system apparatus, further comprising the steps of:

(a) constructing a location data request by a remote data browser, and (b) sending said location data request by said remote data browser to said wireless data transmitter/receiver of said system apparatus, and (c) receiving said location data requests by said communication central control agent of said system apparatus, and (d) processing said data request by said communication central control agent of said system apparatus, and (e) sending a location data result by said communication central control agent of said system apparatus, and (f) receiving said location data result from said communication central control agent of said system apparatus by said remote data browser, and (g) displaying said location data result by said remote data browser.

16. The method as recited in claim 1, wherein said communication operation of step (n) is selectively for the tasks of acquiring a data from a remote data server and displaying a data result at said system apparatus, further comprising the steps of:

(a) constructing a data request by said communication central control agent of said system apparatus, and (b) sending said data request by said communication central control agent of said system apparatus to a remote data request server, and (c) receiving said data requests by said remote data request server, and (d) processing said data request by said remote data request server, and (e) sending a data result by said remote data request server to said system apparatus, and (f) receiving said data result from said remote data request server by said communication central control agent of said system apparatus, and (g) sending said data result to display device by communication central control agent of said system apparatus for displaying.

17. The method as recited in claim 1, wherein said communication operation of step (n) is selectively for the tasks of monitoring subordinating systems apparatus of said system apparatus, further comprising the steps of:

(a) constructing a data request by said communication central control agent of said system apparatus, and (b) sending said data request by said communication central control agent of said system apparatus to a subordinating system apparatus at remote location, and (c) receiving said data requests by said communication central control agent of said subordinating system apparatus, and (d) processing said data request by said communication central control agent of said subordinating system apparatus, and (e) sending a data result by said communication central control agent of said subordinating system to said system apparatus, and (f) receiving said data result from said subordinating system apparatus by said communication central control agent of said system apparatus, and (g) processing said data result by communication central control agent of said system apparatus.

\* \* \* \* \*